UNITED STATES PATENT OFFICE.

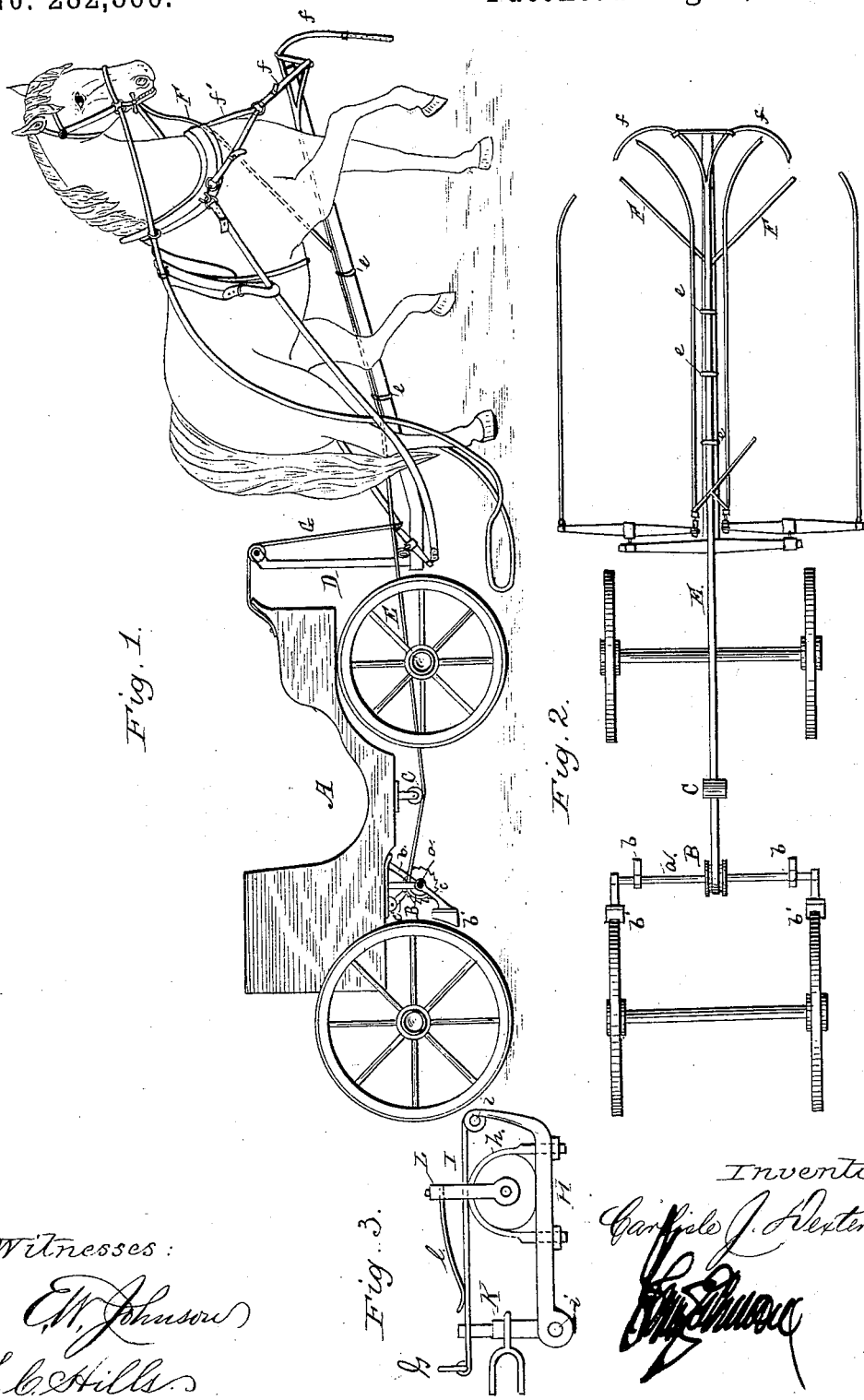

CARLISLE J. DEXTER, OF FOLGER, ILLINOIS.

DEVICE FOR CHECKING RUNAWAY TEAMS.

SPECIFICATION forming part of Letters Patent No. 282,860, dated August 7, 1883.

Application filed June 21, 1883. (No model.)

*To all whom it may concern:*

Be it known that I, CARLISLE J. DEXTER, a citizen of the United States of America, residing at Folger, in the county of Coles and State of Illinois, have invented certain new and useful Improvements in Contrivances to Stop Runaway Teams; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in devices for detaching runaway horses from vehicles, its object being to provide a means whereby the horses can be detached from the whiffletrees, so that they cannot draw the wagon by the traces, and which will hold the horses after being detached from the same; and my invention consists in the construction and arrangement of the straps and devices, as will be hereinafter more fully set forth, and pointed out in the claims.

In the annexed drawings, which illustrate my invention, Figure 1 is a side view, Fig. 2 is a plan view, and Fig. 3 is a detailed view, of the couplings which are attached to the whiffletrees.

A represents a vehicle, which is provided with a transverse brake-bar, $a$, which is suspended under the same by means of suitably-constructed stirrups $b$. At the end of this brake-bar $a$ are secured the brake-shoes $b'$, which are rigidly attached thereto. To the center portion of this brake-bar is also secured a drum, B, which is provided on its side with ratchet-teeth $c$, which engage with the ratchet $c'$, which is attached to the under side of the vehicle. Forward of this brake-bar $a$, and on a line with the drum B, is attached a suitable anti-friction roller, C.

The tongue of the vehicle is attached to the same in the usual manner, and above the same is secured a vertical standard, D, over which passes a strap for disconnecting the coupling by which the inner traces are secured to the whiffletrees.

From the drum B passes a strap, E, or its equivalent, which passes around the same several times and therefrom to the end of the pole, the same being secured to the pole by suitable rings or guides, $e$. This strap E is separated at its end, so as to form the straps $f$, which pass through the ring at the end of the neck-yoke, and are then attached to the collar by a connecting-strap, $f'$. The strap E is also provided with intermediate straps, F, which are at the rear of the neck-yoke, and are attached to the bits or bridles of each horse on the side adjacent to the pole. The straps E may pass through a suitable guide or opening in the vertical standard D. Over this standard D, and secured to the vehicle, is a strap, G, which connects to the attachment, to be hereinafter described, for releasing the traces from the inner ends of the whiffletrees. This attachment, as shown in Fig. 3, consists of a clip, $h$, which encircles the ends of the whiffletrees, and secured thereto is a base-plate, H, which is provided at each end with eyes $i$. Projecting forwardly from the raised end of this base-plate H is a leaf or plate, I, and at the other end a vertical standard, K, these parts I and K being hinged to each other.

To the inner ends of the whiffletrees or the ferrules upon the same are vertical uprights L, which have secured thereto springs $l$, which will bear upon the leaves I and hold the same down. This leaf I is provided at its end with a perforation, through which passes the end of the pillar or standard K, and when said standard K is placed in this perforation the same will be held against displacement. Over this standard is placed a suitable link or eye, to which is attached the end of the trace. It is evident from this construction that when the plate I is raised by means of the strap G the standard K, which receives the draft from the traces, will be released and the traces detached therefrom.

Having thus described the construction of my invention, I will now proceed to set forth how it operates.

The harness being arranged as shown in Fig. 1 of the accompanying drawings, when it is desired to release the horses from the vehicle, the inner traces are detached by pulling upon the strap G. The horses, then being free from the inside traces, in their forward movement will draw upon the straps E through the straps F and $f$, thus putting the brake on the vehicle, and they will be secured thereto by the straps F, which are attached to their bridle.

It will be seen from this invention that I not only provide a means whereby the horses may be detached from the vehicle, so as not to injure the occupants thereof, but I also provide a means whereby the horses, when free from the vehicle, apply the brake thereto, and are held so that they cannot injure themselves or other property.

Having thus described my invention, what I claim as new, and desire to secure by Letters Patent, is—

1. In an apparatus for detaching horses from vehicles, the strap E, secured at one end to the bridles of the horses and at the other end to a brake-operating mechanism, and means for releasing the inside traces, substantially as shown, and for the purpose set forth.

2. In combination with the strap G, for operating a trace-detaching mechanism, the strap E, secured to the brake-bar of the vehicle at one end, and provided at its other end with straps F and $f$, connected to the harness, substantially as shown, and for the purpose specified.

3. The trace-detacher herein described, consisting of a base-plate, H, rigidly attached to the whiffletree, and provided with hinged portions I and K and operating-strap G, substantially as shown.

4. As a means for detaching and securing runaway horses from and to vehicles, the brake-bar $a$, provided with drum B and ratchet, the strap E, attached thereto at one end and passing under the vehicle along the pole of the same, the ends of said straps being provided with supplemental straps F and $f$, attached to the bridle and collar of the harness, respectively, and strap G, having one end located within the vehicle and the other end connected to trace-detaching devices secured to the inner ends of the whiffletrees, the parts being organized substantially as shown, and for the purpose specified.

In testimony whereof I affix my signature in presence of two witnesses.

CARLISLE J. DEXTER.

Witnesses:
LEVI McGINNIS,
JAMES M. CLANCY.